United States Patent [19]

Teagno

[11] 4,428,114

[45] Jan. 31, 1984

[54] MODULAR HARNESS MAKING METHOD AND APPARATUS

[75] Inventor: Vladimiro Teagno, Turin, Italy

[73] Assignee: AMP Incorporated, Harrisburg, Pa.

[21] Appl. No.: 308,623

[22] Filed: Oct. 5, 1981

[30] Foreign Application Priority Data

Oct. 7, 1980 [GB] United Kingdom ................. 8032283

[51] Int. Cl.[3] ....................... H01R 43/00; B23P 23/00; B21F 3/00

[52] U.S. Cl. ..................................... 29/857; 29/564.6; 29/748; 29/747; 140/92.1

[58] Field of Search ................. 29/861, 864, 865, 857, 29/748, 755, 411, 417, 866, 33 M, 33 F, 564.1, 56.6, 564.6, 564.8, 747; 140/93 R, 92.1, 93 A; 100/25

[56] References Cited

U.S. PATENT DOCUMENTS

| | | | |
|---|---|---|---|
| 2,824,358 | 2/1958 | Roach | 29/866 |
| 3,369,434 | 2/1968 | Schwalm | 83/17 |
| 3,471,915 | 10/1969 | Lamoureux | 29/747 X |
| 3,693,228 | 9/1972 | Logan | 29/56.6 |
| 3,766,624 | 10/1973 | Grebe et al. | 29/564.8 |
| 3,907,007 | 9/1975 | Hobbs et al. | 29/56.6 X |
| 3,947,943 | 4/1976 | Kokubo et al. | 29/56.6 |

FOREIGN PATENT DOCUMENTS

| | | | |
|---|---|---|---|
| 1528972 | 10/1978 | United Kingdom . | |
| 2002268 | 2/1979 | United Kingdom | 29/747 |
| 2049500 | 12/1980 | United Kingdom . | |

OTHER PUBLICATIONS

IBM Technical Disclosure Bulletin, vol. 13, No. 12, May 1971.

*Primary Examiner*—Howard N. Goldberg

*Assistant Examiner*—Carl J. Arbes

*Attorney, Agent, or Firm*—Robert W. J. Usher

[57] ABSTRACT

A method and apparatus for making modular electrical harnesses in which, in a first operating zone, a leading end of a wire extending from a wire supply is terminated in a preselected terminal of a row of terminals in a first connector part further wire is fed from the supply to form a trailing loop and the trailing end of the wire is terminated in a preselected terminal of a row of terminals in a second connector part in end-to-end relation with the first connector part and severed from the supply. The connector parts are fed in end-to-end relation along a path extending through several such operating zones progressively to connect all the preselected terminals of the first connector part to all preselected terminals of the second connector parts by respective wire loops. A wire holding head in each zone provides an operable loop forming track.

15 Claims, 12 Drawing Figures

MODULAR HARNESS MAKING METHOD AND APPARATUS

The invention relates to a method and apparatus for making modular electrical harnesses comprising a plurality of wires terminated at respective opposite ends in respective terminals of rows of terminals in a pair of electrical connector parts. The invention also relates to a wire holding head of the apparatus.

In a known harness making method, a leading end of a wire extending from a wire supply is terminated in a preselected terminal of a first connector part located at a first terminating station in an operating zone, further wire is fed from the wire supply to form a trailing loop of selected length and the trailing end of the wire is indexed to a second terminating station spaced from the first terminating station and is severed and terminated in a preselected terminal of a second connector part located at the second terminating station so that the wire loop extends between the corresponding terminals.

In a particular example of such method disclosed in U.K. Patent Publication No. 2,002,268 (4788), where a plurality of wires are to be terminated at respective opposite ends in respective terminals of rows of terminals in first and second connector parts, respectively, the first and second connector parts are located in spaced, parallel relation with the corresponding terminals aligned opposite each other and the leading ends of the wires are simultaneously fed in equally correspondingly spaced relation to the terminals in the rows in respective connectors with the wire loops extending transversely of the terminal rows.

In the particular example of such method, it is not therefore possible to terminate leading and trailing ends of individual wires in non-aligned terminals (using mechanical wire handling equipment).

According to the invention a method of making a modular electrical harness comprises the steps of feeding first and second conductor parts of each pair aligned in end-to-end relation to first and second spaced terminating stations of an operating zone, terminating a leading end of a wire extending from a wire supply in a preselected terminal of the first connector part at the first terminating station, feeding wire from the wire supply to form a trailing loop of preselected length and indexing the trailing end of the wire to the second terminating station into alignment with a preselected terminal of the second connector part, terminating the trailing end of the wire in the preselected terminal of the second connector part and severing the trailing end so that the wire loop extends between the terminals in a plane parallel to the terminal rows, and feeding the first and second connector parts in end-to-end relation (along a path extending) through successive similar operating zones at which the said steps are repeated so that all the preselected terminals of the first connector part are progressively connected to preselected terminals of the second connector parts by respective wire loops.

In the method of the invention, leading and trailing ends of wires can therefore be terminated in respective preselected terminals differently positioned in the rows of respective first and second connector parts. For example, a leading end of a wire can be terminated in the second terminal of the first connector part and the trailing end of that wire terminated in the fifth terminal of the second connector part at one zone. At a successive zone, the leading end of the next wire can be terminated in the first terminal of the first connector part and the trailing end of that wire terminated in the sixth terminal of the second connector part. Furthermore, a single harness may have wires of different lengths fed from the wire supply at different zones.

As the termination of respective wires at successive zones in respective connector part pairs can take place simultaneously, harnesses in which wires of different lengths and gauges are terminated, can rapidly be manufactured.

Apparatus for carrying out the method comprises a series of operating zones; a connector feed path extending through all of the operating zones; each operating zone comprising: a first and second terminating stations spaced apart along the feed path; a wire holding head; means to index the wire holding head along the feed path between the first and second terminating stations to convey leading and trailing ends of a wire extending from a wire supply successively into alignment with preselected terminals of first and second connector parts when located on the feed path at respective terminating stations; means to terminate the leading and trailing ends of the wire respectively in the preselected terminals of the first and second connector parts; means to feed the wire from the supply through the wire holding head to form a loop of preselected length extending between the preselected terminals; means to sever the trailing end of the wire at a location between the second connector part and the wire holding head; and means to feed first and second connector parts in end-to-end relation along the feed path through successive operating zones into alignment with successive first and second terminating stations, respectively.

As the indexing movement of the heads is simply in a single axial direction, along the feed path, the apparatus can be of relatively simply and inexpensive manufacture. Each zone may be of modular construction enabling apparatus of different sizes readily to be assembled.

Advantageously, the wire holding heads each include a loop-forming device defining a semicircular, loop-forming track positioned on an opposite side of the connector feed path from the wire feed means which is operable to advance a leading end of a wire across the feed path around the track prior to a wire terminating and feed cycle, the arrangement being such that the leading end of the wire will be returned by the track during the wire advance to extend in alignment with a selected terminal of a first connector part located at the first station from a side of the connector part remote from the wire feed means. Means are provided to open the track during or subsequent to termination of the leading end of the wire to release the wire to permit unimpeded wire feed through the wire holding head by the wire feed means to form a wire loop of harness length.

As a result of the leading end of the wire extending away from the first connector parts after termination on the side of the feed path remote from the wire feed device the loops formed during wire feed fall on the side of the feed path remote from the wire feed means and, preferably, the wire supplies, and other operating mechanisms of the apparatus, reducing risk of entanglement.

Conveniently, first and second wire engaging rams are mounted in each wire holding head in alignment with the wire exit, and wire entry ends of the track, respectively, which rams are operable alternately, by a force applying member, to terminate the leading and trailing ends of respective wires in preselected terminals of first and second connector parts, respectively.

Preferably, the force applying member is mounted between the rams with its line of action parallel to the direction for operable movement of the ram, the surface of the member being cylindrical, L-shaped slots being formed in opposite curved faces and having axially extending upright portions and transverse portions extending from the upright portions in opposite circumferential directions, connecting pins extending from the respective rams into the respective slots, means being provided to pivot the force applying member about the line of action between first and second positions into aperture alignment with alternate rams in pins of first and second rams respectively are being received in the respective transverse slot portions in the first and second portions so that successive axial movement of the force applying member operates alternate rams.

Desirably, the wire holding head includes first and second pairs of wire receiving jaws, each pair being mounted between the rams and the entry and exit ends of the track respectively, the jaws of each pair being biased together to define wire guiding mouths aligned with the entry and exit ends of the track, respectively, means being provided to open the first and second pairs of jaws during terminating strokes of respective rams to release the leading and trailing ends of the wire successively. Preferably, the jaw opening means comprises a wire engaging member arranged to move between the individual jaws of a pair to open the jaws and expel the wire during the terminating stroke of an adjacent ram.

More specifically, the loop-forming track is defined by two members manually biased together and the track opening means are connected to the force applying member to open the track by movement of the force applying member to operate the first ram, latch means being provided to retain the track members apart to permit wire feed, means being provided to release the catch means during pivotal movement of the force applying member from the second to the first position.

The connectors may be urged along the feed path by engagement with successive pawls carried by a longitudinally reciprocated compound bar extending along the feed path, each pawl being biased by a spring to extend into the connector feed path to index connectors during a forward stroke and out of the feed path to ride under the connectors during a return stroke.

Preferably, successive pawls are carried by alternate members of the compound bar and means are provided to alter the relative longitudinal positions of the members thereby to alter the spacing of the pawls to accommodate connectors of different lengths.

Connector stop pins having cam surfaces engageable by a rod arranged for reciprocal movement adjacent and along the feed path to project the stop pins, into and out from the connector path to ensure correct alignment of the connectors at the respective terminating stations are located at each operating zone.

The invention includes a wire holding head comprising a loop forming device defining a semicircular loop-forming track and means to advance a leading end of a wire around the track to form a loop, the loop-forming device comprising two channel-forming members, means being provided to move the channel-forming members between adjacent positions defining a close channel for completely enclosing the wire loop and spaced apart positions to open the channel and release the wire loop to permit unimpeded wire feed through the wire holding head by the wire feed means to form a wire loop of preselected harness length.

A specific example of a harness making apparatus according to the invention will now be described with reference to the accompanying drawings in which.

Figure 1:
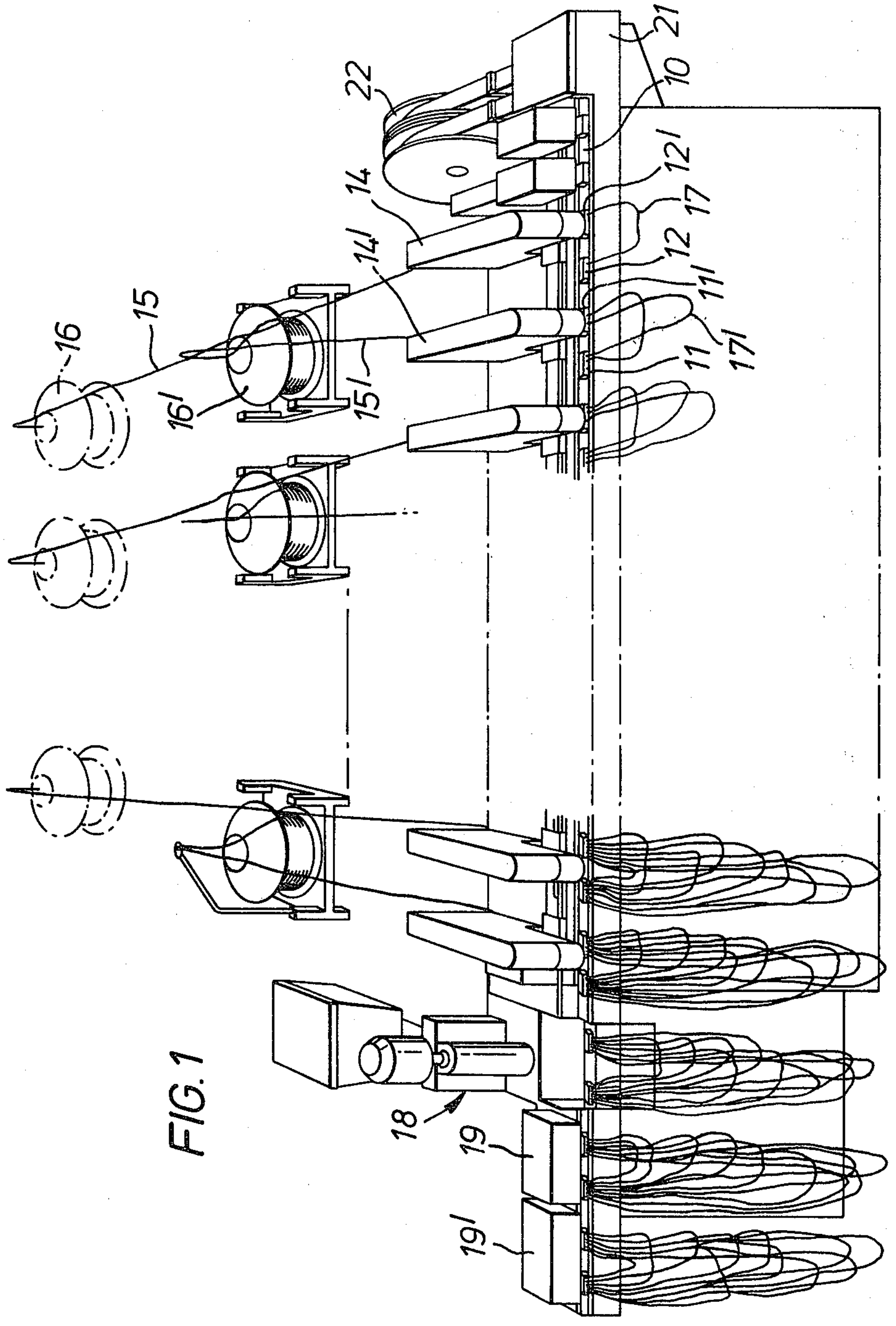
FIG. 1 is a schematic perspective view of the apparatus.

Briefly described, with particular reference to FIG. 1, the harness making apparatus comprises a feed path 10 along which a series of pairs of connectors 11, 11', 12, 12' is fed, with the connectors extending in end-to-end relation, through a series of operating zones in which respective wire holding heads 14, 14' draw preselected lengths of wires 15, 15' from supply reels 16, 16' and terminate the wire lengths at respective opposite ends in selected terminals of a row of terminals in respective connectors of each connector pair. The wire holding head 14 terminates a leading end of the wire 15 in a preselected terminal of a leading connector 12 of a connector pair at a first terminating station in the first operating zone, an associated wire feed means 35 (FIG. 3) then feed a preselected length 17 of wire 15 from the supply 16 and the head indexes along the feed path to the trailing connector 12' of that connector pair at a second terminating station in the first operating zone and terminates the trailing end of the wire length 17 in a preselected terminal of the trailing connector 12; also severing the wire lengths from the supply. As a connector pair is fed past successive zones, an electrical harness is progressively built up comprising a plurality of wires which may be of different gauge and length terminated at respective opposite ends in preselected terminals at any position in their rows in respective connectors of a pair.

Figure 2:
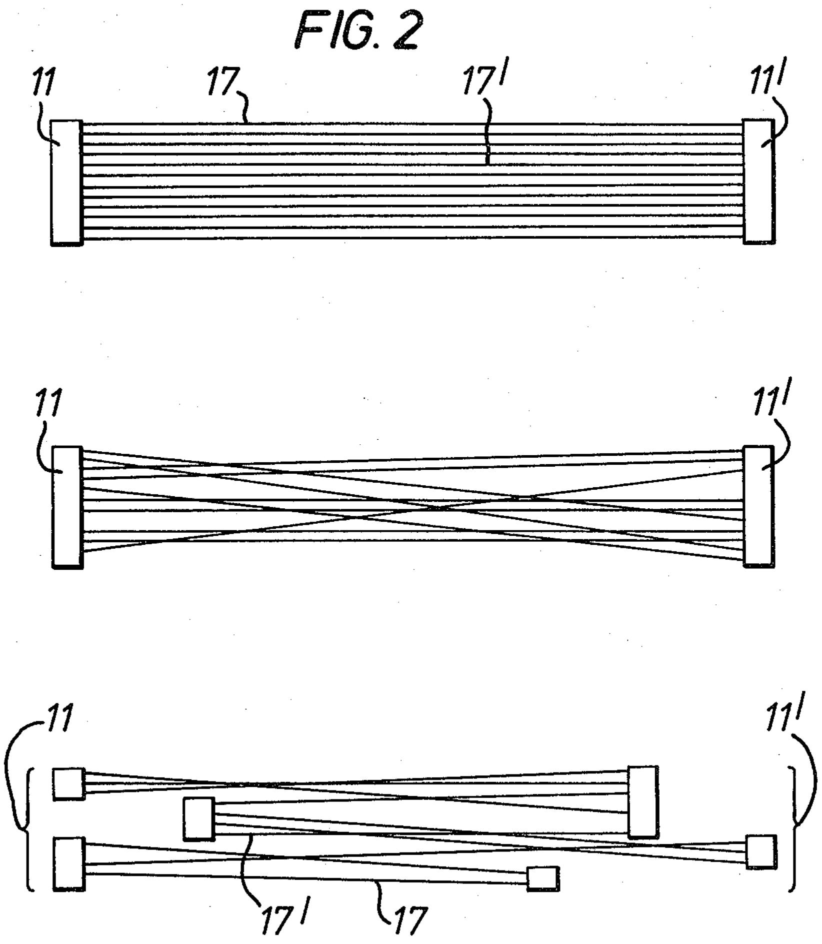
FIG. 2 is a plan view of three examples of different harness constructions that can be made by the apparatus.

A connector stripping mechanism 21 of conventional construction is mounted at the connector entry end of the feed path to extract pairs of individual connectors from carrier strips wound on reels 22 and various different operating stations may be mounted towards the connector exit end of the feed path. A sealing station 18 for example may be provided to inject waterproof sealant into the connector housings as may checking stations 19 and a connector severing station 19' which severs individual connectors into smaller connector modules, as desired. Examples of some harness configurations are shown in FIG. 2.

Figure 3:
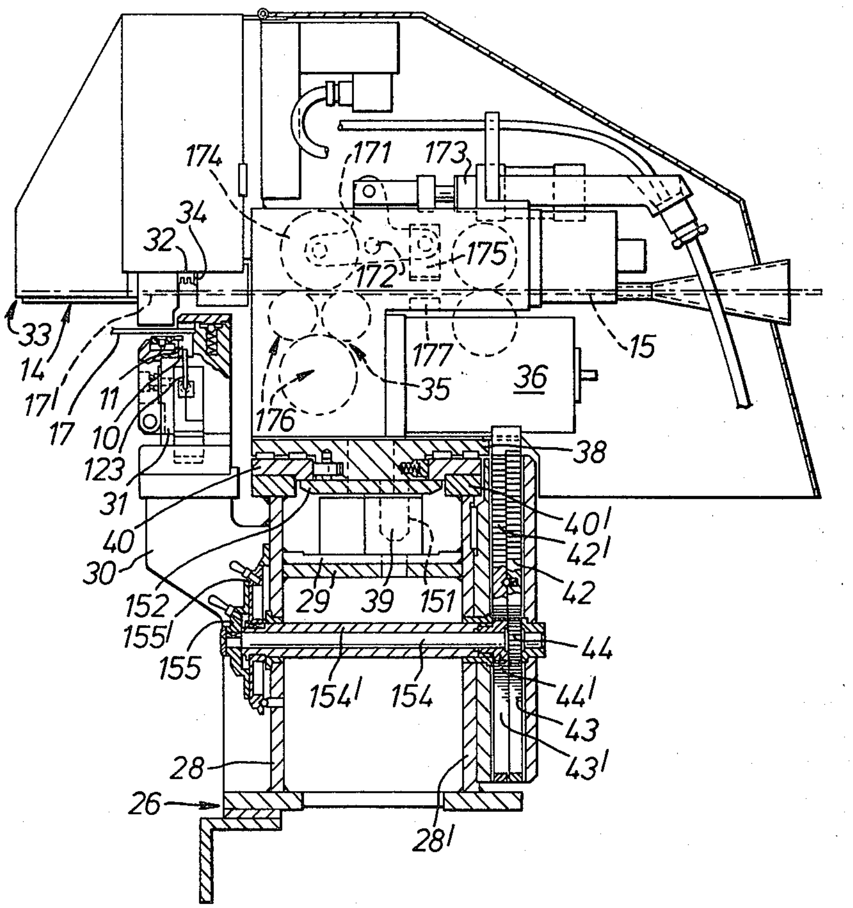
FIG. 3 is a side elevational view partly in cross-section of an operating zone of the apparatus.

As best seen in FIG. 3, in general structure, the apparatus comprises a base frame 26 including a pair of uprights 28, 28' fixed spaced apart in parallel relation by cross members 29. A cantilever bracket arm 30 extends from a front end of upright 28 and supports at an upper end, an elongate block 31 defining the connector feed path 10 and housing a connector indexing mechanism described below.

The wire holding head 14 is located generally above the feed path 10 and includes a wire terminating ram 32 and severing blade 34 aligned above a connector 11 on the feed path; an associated wire loop forming device 33 located on a front side of the feed path; and an associated wire feed mechanism 35 powered by a electric motor 36, located on a rear side of the feed path.

The wire holding head and associated mechanisms are mounted on a slide plate 38 mounted for sliding indexing movement, together as a unit longitudinally of the feed path on spaced parallel rails 40 and 40' carried by upright frame members 28, 28'. Indexing movement of the wire holding head is effected by piston and cylinder means 39 mounted on cross member 29.

As will be described in more detail below, stop plates 42 are mounted for vertical movement by rack and pinion mechanisms 43 and 44 into the indexing path of the head to limit its indexing movement.

The wire holding head 14 and associated mechanism will now be described with particular reference to FIGS. 4 to 7.

Figure 6:
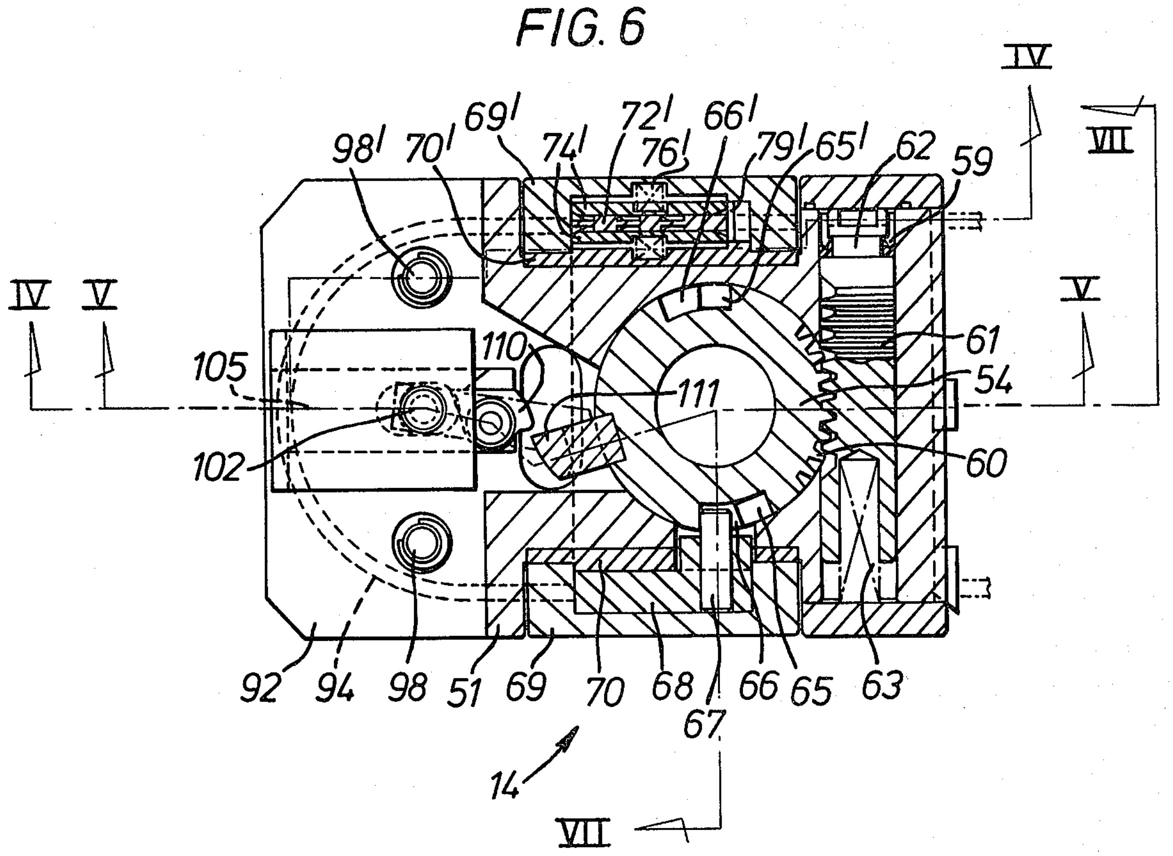
FIG. 6 is a cross-sectional view of the wire holding head taken along line VI—VI of FIG. 5.

The wire holding head 14 comprises a block 51 (FIG. 5) having a vertically extending bore 52 counterbored at 53 to define upper and lower cylinders. A hollow, cylindrical, force applying member 54 is mounted for reciprocal pivotal movement about its axis in the bore 52 on upper and lower bearings 55 and 56 carried by working pistons 57 and 58, respectively, in upper and lower bores. Vertically extending pinion teeth 60 are cut in a surface portion of the member 54 and mesh with a rack member 61 mounted for reciprocal movement along a horizontal bore 59 in the block. As shown in FIG. 6 working piston 62 mounted in one end of the bore moves the rack 61 against the action of a return spring 63 mounted in the other end of the bore 59. L-shaped slots are formed in opposite surfaces of the force applying member 54, such slots having vertical portions 65, 65' and horizontal portions 66, 66' respectively, the horizontal portions extending in mutually opposite circumferential directions. Connecting pins 67 are located at one end in each slot and are fixed at their other ends in plates 68 mounted for vertical movement between guide plates 69 and 70 and 69' and 70' fixed in recesses in respective opposite sides of the block 51. The wire engaging ram 72 is fixed in a clevis 71 formed in a lower end of the plate 68. The ram 72 extends between wire holding jaws 74 biased together by springs 76 to define between them a wire guiding mouth 73. The jaws are formed with fulcrum defining bosses 75 pivotally seated in recesses 77 so that downward movement of the ram pushes the jaws apart to engage and expel a wire 17 located in the mouth 73 during termination. A terminating ram 78 (one only shown) aligned with the connector feed path are carried by an end of each plate. Plates 68 and 68' each carry a drive pin 80 (FIG. 4) engaging a severing blade 79 adjacent the rams. A cam block 90 engages the drive pin 80 to depress it against a return spring so that the drive pin only engages the blade for a small initial portion of the downward movement.

A wire guiding nozzle 81 is mounted on a plate 82 on one side of the block. A ball catch 91 is mounted in the block 51 to lock the plate 68 in its uppermost position.

Figure 4:
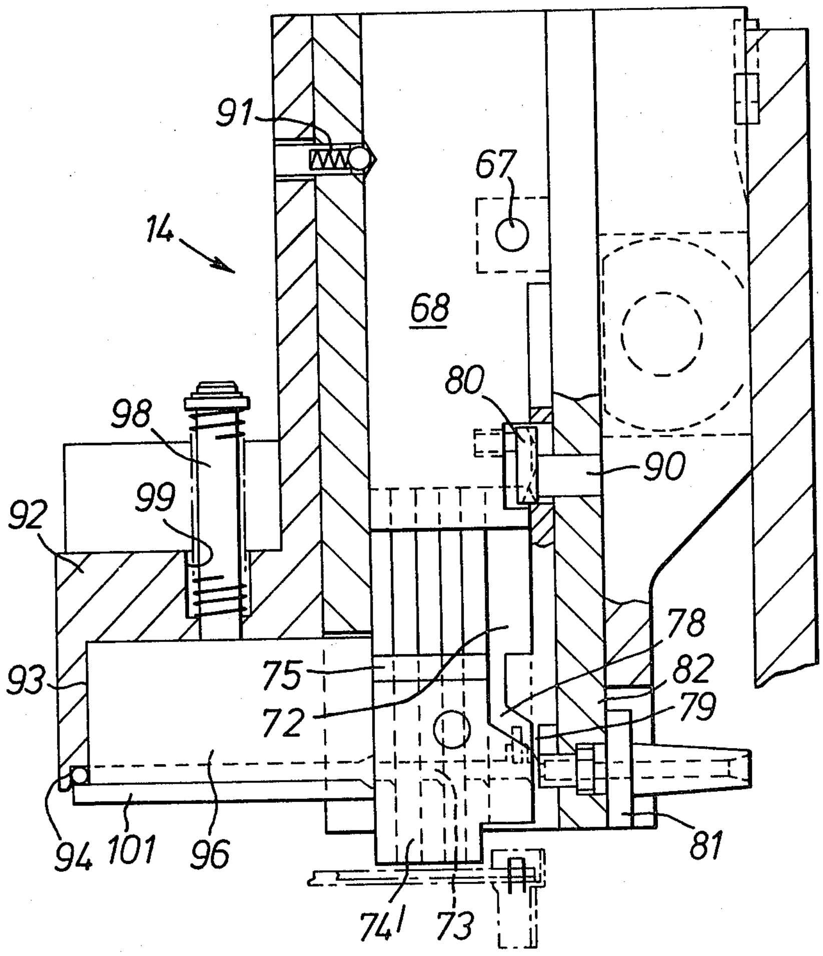
FIG. 4 is a side elevation partly in cross-section taken along line IV—IV of FIG. 6 of a wire holding head of the apparatus.
Figure 5:
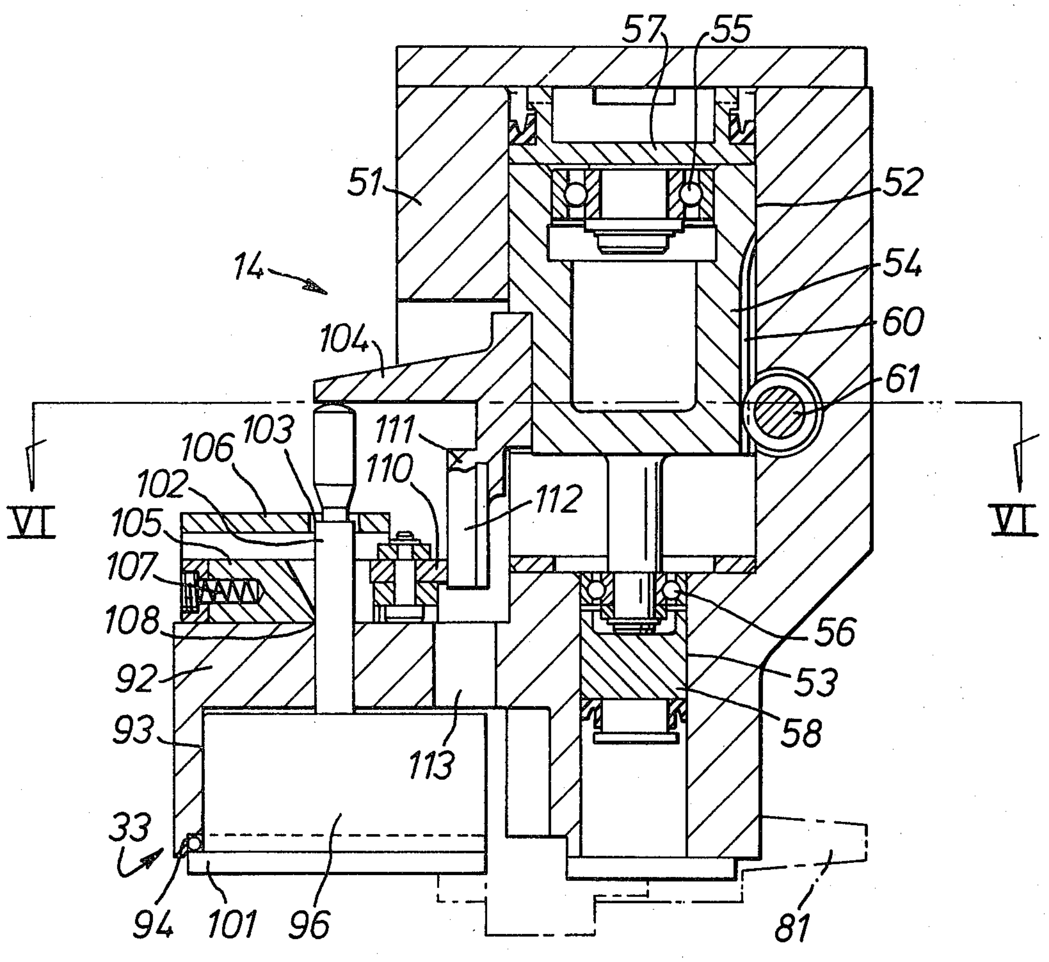
FIG. 5 is a cross-sectional view of the wire holding head taken along line V—V of FIG. 6.
Figure 7:
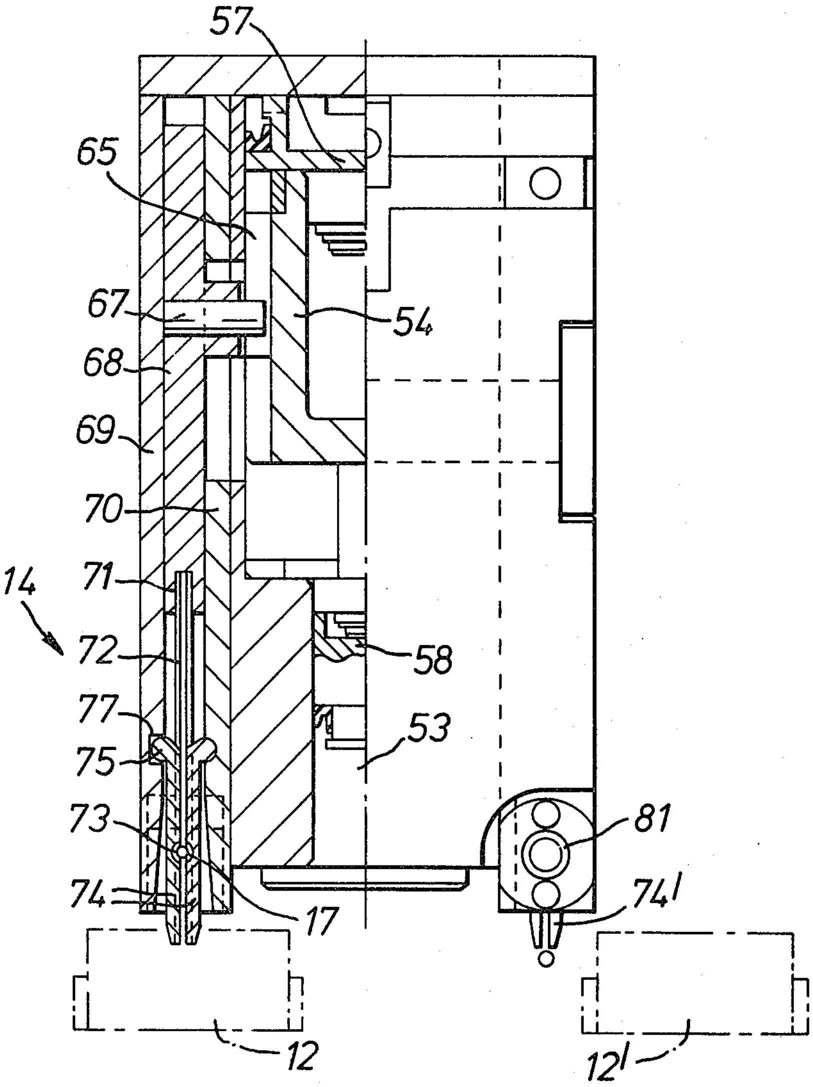
FIG. 7 is an elevational view of the wire holding head partly in cross-section along line VII—VII of FIG. 5.

The loop-forming device 33 comprises a forward extension 92 of the block 51 formed with a downwardly opening, substantially hemicylindrical, recess 93. A right angled groove 94 extends around the periphery of the recess. A hemicylindrical drum 96 having a flange 101 protruding horizontally around the lower periphery is mounted in the recess 93 by spaced rods 98, 98' (FIG. 4) mounted for vertical movement in counterbored apertures 99 in the block extension 92, by compression springs 98. The springs 98 normally maintain the lip 101 and groove 94 adjacent to define wire guiding track of enclosed channel section having wire entry and exit ends aligned with the wire receiving mouths 73 of jaws 74 and 74' (FIGS. 4 and 7).

A track-opening rod 102 (FIG. 5) extends upwardly between rods 98, 98' from the upper surface of drum 96 through an aperture in the block extension 92 and a latch housing 106 fixed thereon into abutment with an operating arm 104. The arm 104 is fixed in force applying member 54 and protrudes through an aperture in the front of block 51. The rod 102 is formed with a latching shoulder 103 intermediate its ends.

A latch slide 105 having an aperture receiving the rod 102 is mounted in the housing 106 with a cam-formed edge portion 108 of the slide aperture biased against the rod by a compression spring 107. The edge portion 108 will engage shoulder 103 on the rod when depressed to open the track to latch the track open to permit unhindered wire feed. A release cam 110 is mounted on the latch housing 106 for pivotal movement about a vertical axis and projects into the path of a release lug 111 depending from the arm 104. It should be noted that one side of the lug has a chamfered surface 112 permitting the lug to ride across a curved surface of the release cam 110 during movement of the force applying member in one direction. Movement of the force applying member in the opposite direction and consequent engagement of the lug and release cam depresses the latch slide 105 against the compression spring 107 to release the rod 102 permitting compression springs 98 to raise the drum 96 closing the track.

Figure 8:
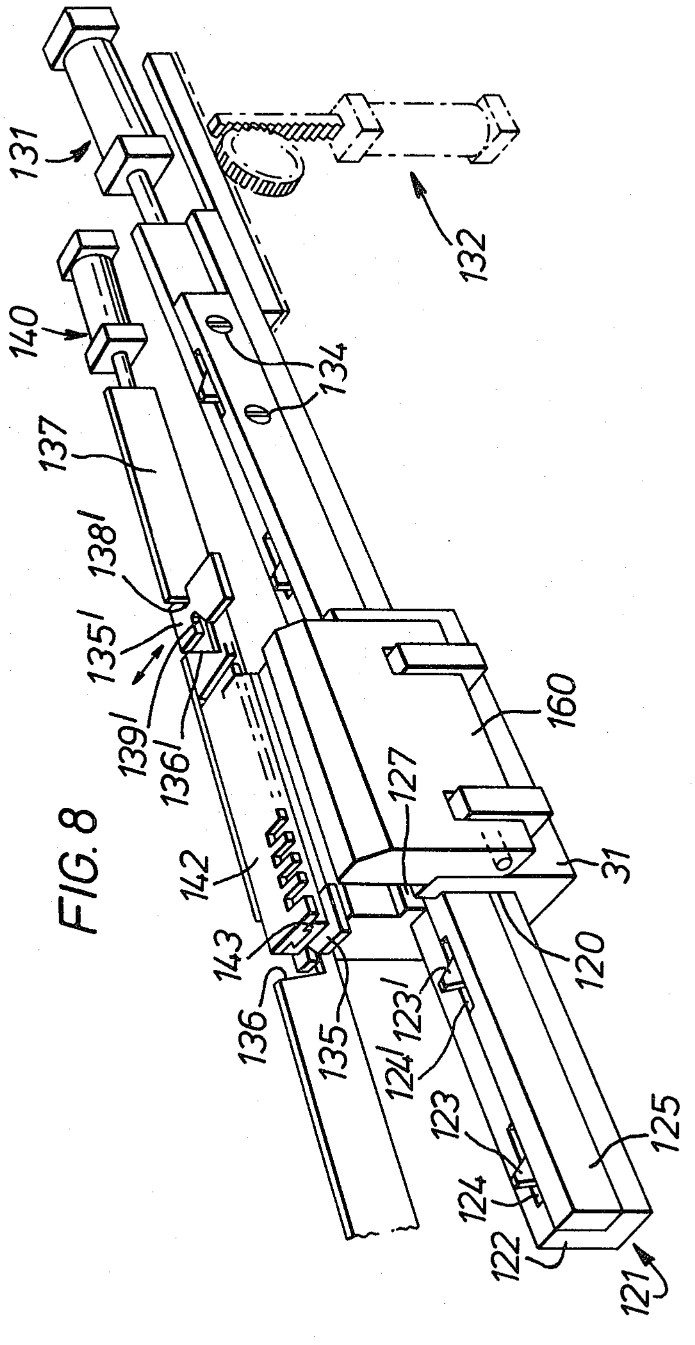
FIG. 8 is a fragmentary perspective view of the connector feed mechanism of the apparatus.
Figure 9:
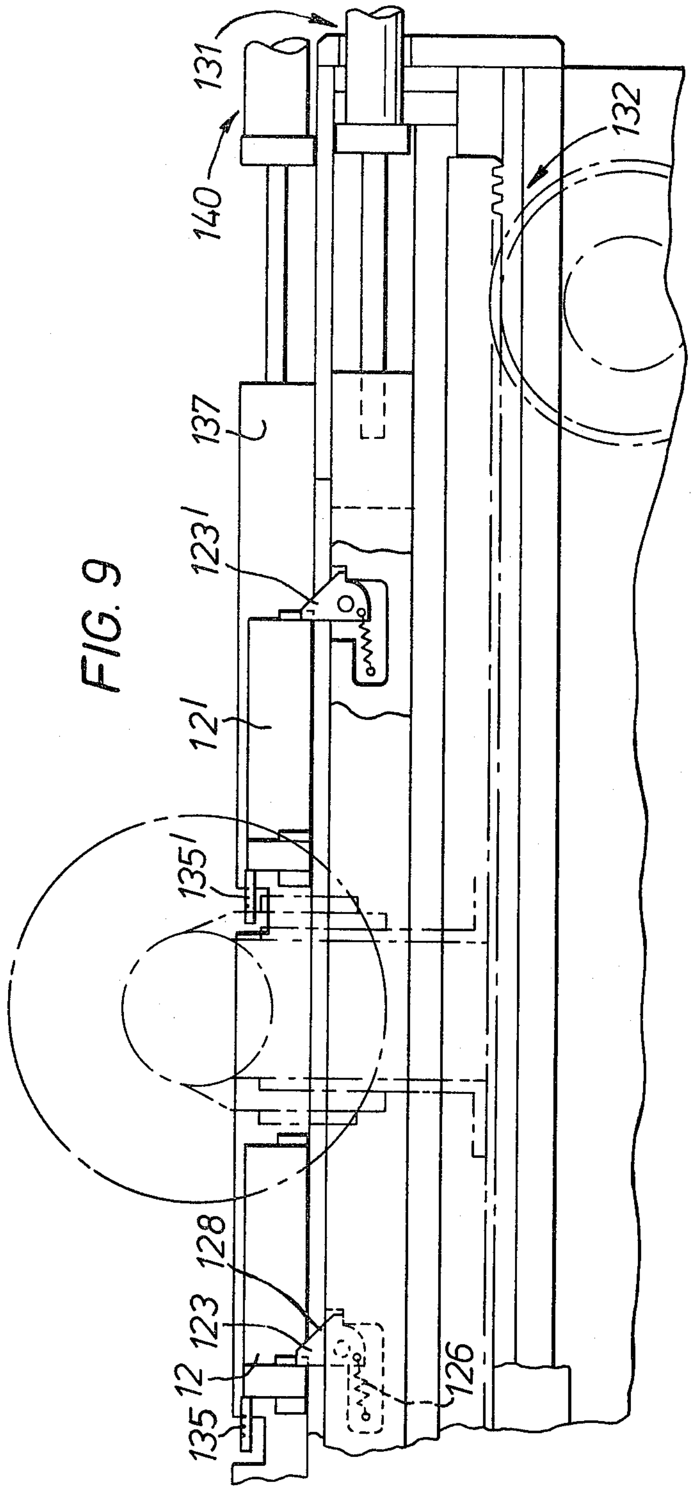
FIG. 9 is a fragmentary front elevational view of the connector feed mechanism of FIG. 8.
Figure 10:
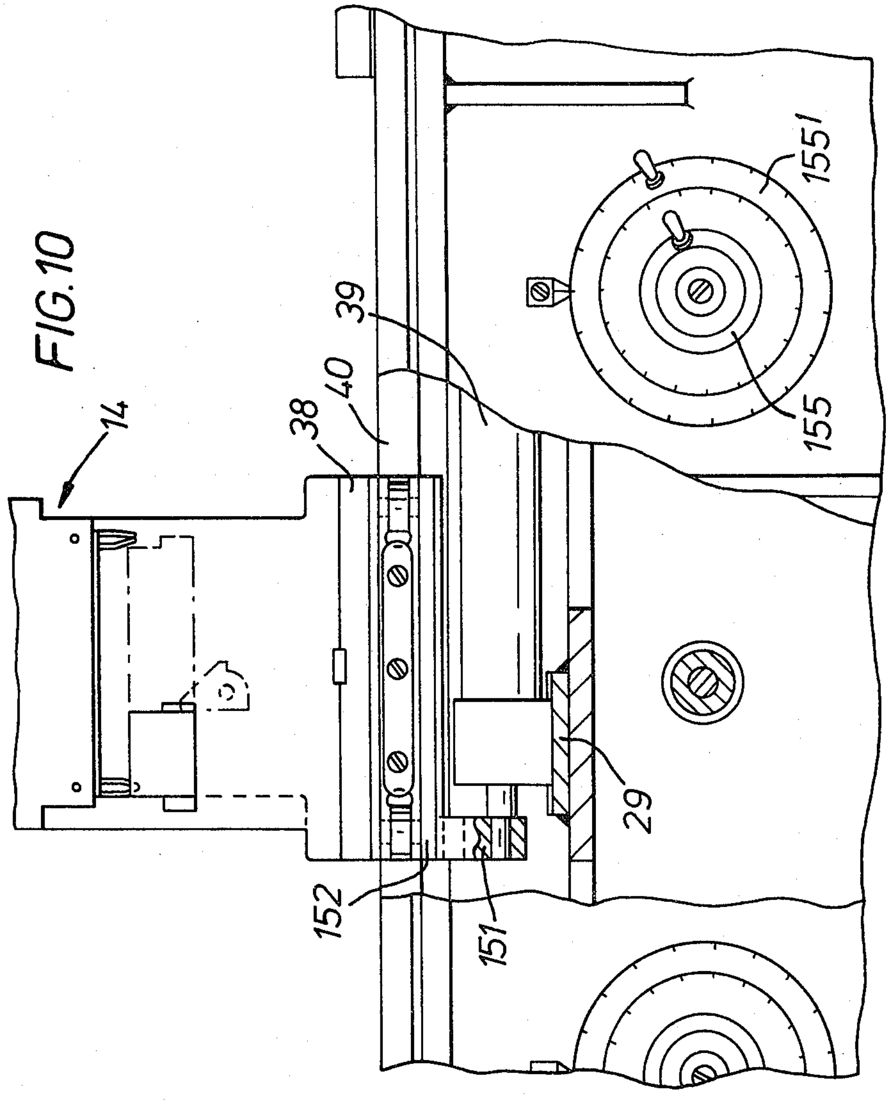
FIG. 10 is a fragmentary front elevational view partly in cross-section, of a head indexing mechanism of the connector feed mechanism.
Figure 11:
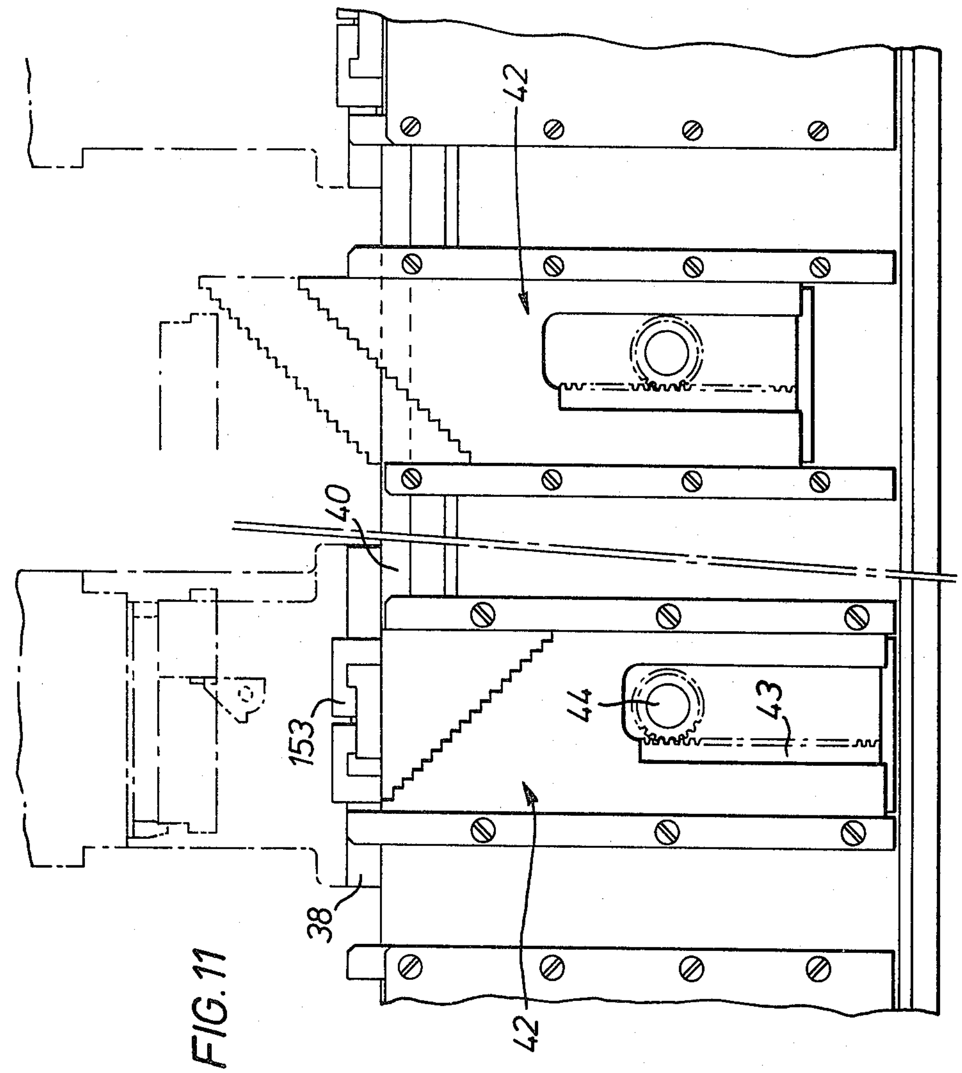
FIG. 11 is a rear fragmentary view of the head indexing mechanism of FIG. 10.
Figure 12:
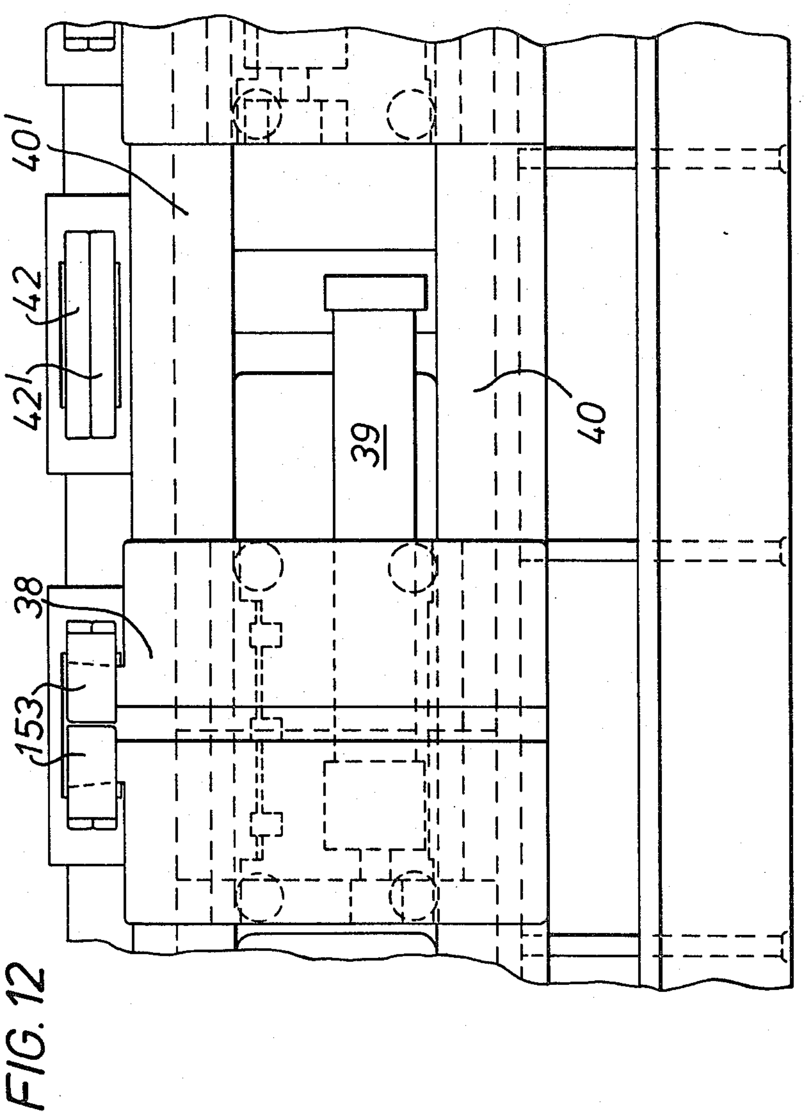
FIG. 12 is a fragmentary plan view of the head indexing mechanism of FIGS. 10 and 11.

As shown particularly in FIGS. 8 and 9, the connector indexing mechanism comprises a compound bar 121 mounted as a sliding fit in a horizontal channel 120 formed in block 31. The compound bar comprises a first longitudinally grooved bar 122 and a second bar 125 mounted along the groove. Each bar is formed along abutting sides with a series of longitudinally spaced recesses 124, 124', the recesses 124 on the first bar being staggered in relation to the recesses 124' on the second bar. Connector engaging pawls 123, 123' pivotally mounted in respective recesses are biased by springs 126 to extend through slot 127 in block 31 into the connector feed path. The pawls have rear cam surfaces 128 which permit them to ride under connectors on a return stroke of the bar 121. The bar 121 is reciprocated longitudinally of the feed path to index the connectors during a forward stroke by a piston and cylinder device 131 or, alternatively, by a piston and cylinder device combined with a rack and pinion mechanism 132 (shown in dotted lines). Screws 134 attach bars 122 and 123 together, rearrangement of which screws permits the relative longitudinal positions of the bars to alter the separation of the pawls 123, 123' and, therefore, the length of the indexing stroke. Connectors of different lengths and spacing may therefore be accommodated.

Connector stop plates 135, 135' are mounted transversely of the connector feed path above the compound bar 121 and extend through apertures 136, 136' in longitudinally extending operating bar 137 operatively connected for reciprocating movement to piston and cylinder 140. The stop plates are formed on respective opposite sides with cam surfaces 138' and 139' engageable by opposite edge portions of the aperture during reciprocation of the operating bar to cam the stop plates into, and out from, the connector feed path, alternatively, to prevent connector overrun and permit connector feed.

A toothed guide plate 142 is mounted on slide 143 for longitudinal movement relative to plates 135, 135' to align an aperture of the plate 142 with the appropriate connector cavity to guide the terminating rams 78 into the cavity. This allows the accommodation of different connector cavity pitch. A cover plate 160 is pivotally mounted on the front of block 31 to permit access to the terminating area.

As best seen in FIG. 3, and FIGS. 10 to 12, in the head indexing mechanism, the operating piston and cylinder device 39 is operatively connected to a lug 151 depending from a plate 152 fixed to the slide plate 38. The head traverse is limited by engagement of a stop block 153 carried by slide plate 38 with opposed stepped surfaces of stop plates 42 or 42', raised into the path of movement of the head by associated rack and pinions 43, 43', and 44, 44' operatively connected to handwheels 155, 155' mounted on the front of upright 28. The provision of two stepped plates enables a high degree of accuracy of indexing traverse to be achieved.

The wire feed mechanism 35 is of known construction, similar to that described in our U.K. Pat. No. 1,524,788 (5064). A bell crank 171 having three arms is mounted for pivotal movement on pin 172 by a piston and cylinder device 173 connected to an end of one arm. The ends of the other arms carry a clutch roller 174 and a brake 175, respectively. Mounted on an opposite side of a wire feed path and in alignment with the clutch roller 174 and brake 175, respectively, are rollers 176 driven by motor 36, and brake pad 177. Pivotal movement of the bell crank between first and second pivotal positions operates the wire feed and wire braking respectively.

In operation, the wire holding head unit is positioned above the feed path with the terminating ram 78 associated with jaw 74' (as shown in FIG. 4) in alignment with a predetermined terminal of a leading connector 12 of a connector pair, the wire feed mechanism 35 is then operated to feed a leading end of wire through nozzle 81 and mouth 73 along the enclosed track 94 into alignment with the ram 78.

The force applying member 54 is then depressed by piston 57 when in the pivotal position in which the pin 67 is located in the horizontal slot portion 66', thereby depressing the terminating ram 78 and ram 72' to terminate the leading end of the wire in the terminal, at the same time opening the jaws 74' to expel the wire from the associated mouth 73. Depression of the force applying member 54 also opens the track to permit release of the wire loop formed thereby.

Force applying member 54 is then raised by the piston 58 raising the terminating ram 78 and ram 72' permitting the jaws 74' to close, but the track is latched open by engagement of the latch slide 105 with the rod 102.

The wire feed mechanism 35 is then operated to feed any desired length of wire, which hangs as a loop in front of the apparatus, and the wire holding head unit is indexed along the feed path to align the other terminating ram 78 at the entry end of the track 94 with a preselected terminal of a trailing connector 12' of the connector pair.

The force applying member 54 is pivoted by operation of rack 61 to bring pin 67 into horizontal slot portion 66 (cam 112 of release lug 111 riding over cam 110), as shown in FIG. 6. The force applying member is again depressed to effect termination and severing of the trailing end of the wire and release of the wire from the jaws 74. The wire loop is now completely released from the wire holding head unit.

Return of the force applying member now raises terminating ram 78, severing blade 79 and permits closure of jaws 74. Rack 61 is then returned to pivot the force applying member 54 back to the former position and during such movement release lug 111 engages and pivots release cam 110 to depress latch slide 105 thereby away from rod 102 permitting complete closure of the track 91 by return springs 98, 98' FIG. 6.

The connector pair is then indexed along the feed path to the next operating zone where another wire is terminated and the wire holding head unit indexed back to its initial position to bring terminating ram 78' into alignment with a terminal of leading connector of the next connector pair.

What is claimed is:

1. A method of making a modular electrical harness comprising a plurality of wires terminated at respective opposite ends in respective terminals of rows of terminals in a pair of electrical connector parts, which method comprises the steps of feeding first and second connector parts of each pair aligned in end-to-end relation to first and second spaced terminating stations of an operating zone, terminating a leading end of a wire extending from a wire supply in a preselected terminal of the first connector part at the first terminating station, feeding wire from the wire supply to form a trailing loop of preselected length and indexing the trailing end of the wire to the second terminating station into alignment with a preselected terminal of the second connector part, terminating the trailing end of the wire in the preselected terminal of the second connector part and severing the trailing end so that the wire loop extends between the terminals in a plane parallel to the terminal rows, and feeding the first and second connector parts in end-to-end relation (along a path extending) through successive similar operating zones at which the said steps are repeated so that all the preselected terminals of the first connector part are progressively connected to preselected terminals of the second connector parts by respective wire loops.

2. Apparatus for making a modular electrical harness comprising a plurality of wires terminated at respective opposite ends in respective terminals of rows of terminals in first and second electrical connector parts, which apparatus comprises a series of operating zones; a connector feed path extending through all of the operating zones; each operating zone comprising: first and second terminating stations spaced apart along the feed path; a wire holding head movably mounted on support means; means mounted on the support means to index the wire holding head along the feed path between the first and second terminating stations thereby to convey leading and trailing ends of a wire extending from a wire supply successively into alignment with preselected terminals of the first and second connector parts when located on the feed path at respective terminating stations; means movably mounted in the wire holding head to terminate the leading and trailing ends of the wire respectively in the preselected terminals of of the first and second connector parts; means mounted on the support means to feed the wire from the supply through the wire holding head to form a loop of preselected length extending between the preselected terminals; means movably mounted on the wire holding head to sever the trailing end of the wire at a location between the second connector part and the wire holding head; and means movably mounted on the support means to feed first and second connector parts in end-to-end relation along the feed path through successive operating zones into alignment with successive first and second terminating stations, respectively, so that all the preselected terminals of the first connector part are progressively connected to preselected terminals of the second connector parts by respective wire loops.

3. Apparatus according to claim 2, in which the wire holding heads each include a loop-forming device providing a semicircular, loop-forming track positioned on an opposite side of the connector feed path from the wire feed means which is operable to advance a leading end of a wire across the feed path around the track prior to a wire terminating and feed cycle, the arrangement being such that the leading end of the wire will be returned by the track during the wire advance to extend in alignment with a preselected terminal of a first connector part located at the first station from a side of the connector part remote from the wire feed means.

4. Apparatus according to claim 3, in which means which are integral with the wire holding head are provided to open the track during or subsequent to termination of the leading end of the wire to release the wire to permit unimpeded wire feed through the wire holding head by the wire feed means to form a wire loop of harness length.

5. Apparatus according to claim 3, in which first and second wire engaging rams are mounted in each wire holding head in alignment with the wire exit, and wire entry ends of the track, respectively, a force applying member being mounted in the wire holding head to operate the rams alternately, to terminate the leading and trailing ends of respective wires in preselected terminals of first and second connector parts respectively.

6. Apparatus according to claim 5, in which the force applying member is mounted between the rams with its line of action parallel to the direction of operable movement of the rams, means being provided to pivot the force applying member about the line of action between first and second positions into operative alignment with alternate rams.

7. Apparatus according to claim 6, in which the force applying member is cylindrical and is mounted with its axis coincident with the line of action, the surface of the member being cylindrical, L-shaped slots being formed in opposite curved faces and having axially extending upright positions and transverse portions extending from the upright portions in opposite circumferential directions, connecting pins extending from the respective rams into the respective slots, the pins of first and second rams respectively being received in the respective transverse slot portions in the first and second positions so that successive axial movement of the force applying member operates the rams alternately.

8. Apparatus according to claim 5, in which first and second pairs of wire receiving jaws are mounted in the wire holding head between the rams and the entry and exit ends of the track, respectively, the jaws of each pair being biased together to define wire guiding mouths aligned with the entry and exit ends of the track respectively, means being provided to open the first and second pairs of jaws during terminating strokes of respective rams to release the leading and trailing ends of the wires successively.

9. Apparatus according to claim 8, in which the jaw opening means (72, 72') comprises a wire engaging member (72, 72') arranged to move between the individual jaws of a pair to open the jaws and expel the wire during the terminating stroke of an adjacent ram.

10. Apparatus according to claim 4, in which the loop-forming track is provided by two members, normally biased together and the track opening means are connected to the force applying member to open the track by movement of the force applying member to operate the first ram, latch means integral with the wire holding head being provided to retain the track members apart to permit wire feed, means integral with the wire holding head being provided to release the latch means during pivotal movement of the force applying member from the second to the first position.

11. Apparatus according to any one of claims 2 to 10, in which the connector feed means comprises a series of pawls carried by a longitudinally reciprocated compound bar mounted on the support means and extending along the feed path, each pawl being biased by a spring to extend into the connector feed path to index connectors during a forward stroke and out of the feed path to ride under the connectors during the return stroke.

12. Apparatus according to claim 11, in which successive pawls are carried by alternate members of the compound bar and means are provided to alter the relative longitudinal positions of the members thereby to alter the spacing of the pawls to accommodate connectors of different lengths.

13. A wire holding head comprising a loop-forming device defining a semicircular loop-forming track and means integral with the wire holding head to advance a leading end of a wire around the track to form a loop, the loop-forming device comprising two channel-forming members, means connecting the channel forming members being provided to move the channel-forming members between adjacent positions defining a closed channel for completely enclosing the wire loop and spaced apart positions to open the channel and release the wire loop to permit unimpeded wire feed through the wire holding head by the wire advancing means to form a wire loop of preselected harness length.

14. A wire holding head according to claim 13, further comprising wire terminating means movably attached to the wire holding head and means operably connected to the terminating means to operate the wire terminating means at the exit and entry ends of the track alternately.

15. Harness making apparatus mounted on support means including a wire holding head according to claim 14 further comprising means mounted on the support means to index the wire holding head along a path extending through the entry and exit ends of the track between first and second terminating stations.

* * * * *